2 Sheets—Sheet 1.

L. DORMAN.

WHEELS FOR VEHICLES.

No. 7,186. Reissued June 20, 1876.

Lathrop Dorman. INVENTOR

WITNESSES
Harry King
H. H. Young

By his Attorney Henry Baldwin Jr.

N. PETERS, PHOTO-LITHOGRAPHER, WASHINGTON, D. C.

2 Sheets—Sheet 2.

L. DORMAN.

WHEELS FOR VEHICLES.

No. 7,186.

Reissued June 20, 1876.

WITNESSES

Harry King.

H. H. Young

Lathrop Dorman INVENTOR

By his Attorney Henry Baldwin Jr.

N. PETERS, PHOTO-LITHOGRAPHER, WASHINGTON, D. C.

UNITED STATES PATENT OFFICE.

LATHROP DORMAN, OF WILLIMANTIC, CONNECTICUT, ASSIGNOR, BY MESNE ASSIGNMENTS, TO CHAS. W. FILLMORE, JOHN R. MINER, THOS. HOOPES, JR., AND STEPHEN P. DARLINGTON.

IMPROVEMENT IN WHEELS FOR VEHICLES.

Specification forming part of Letters Patent No. 64,955, dated May 21, 1867; reissue No. 5,509, dated July 29, 1873; reissue No. 7,186, dated June 20, 1876; application filed June 12, 1875.

*To all whom it may concern:*

Be it known that I, LATHROP DORMAN, formerly of Worcester, Massachusetts, but now of Willimantic, in the county of Windham and State of Connecticut, have invented certain new and useful Improvements in Wheels for Vehicles, of which improvements the following is a specification:

My invention relates to that class of wheels in which a wooden core is combined with a metallic shell. Its object is to produce a light, strong, and durable wheel, with a compact hub, in which each spoke is better and more firmly secured and supported, and more thoroughly braced, than heretofore.

Figure 1:
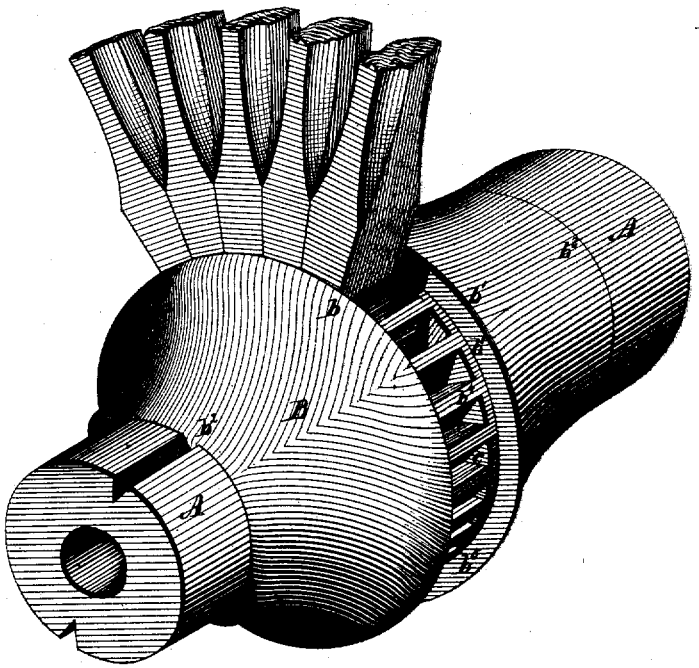
Figure 4:
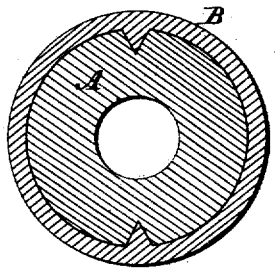
Figure 2:
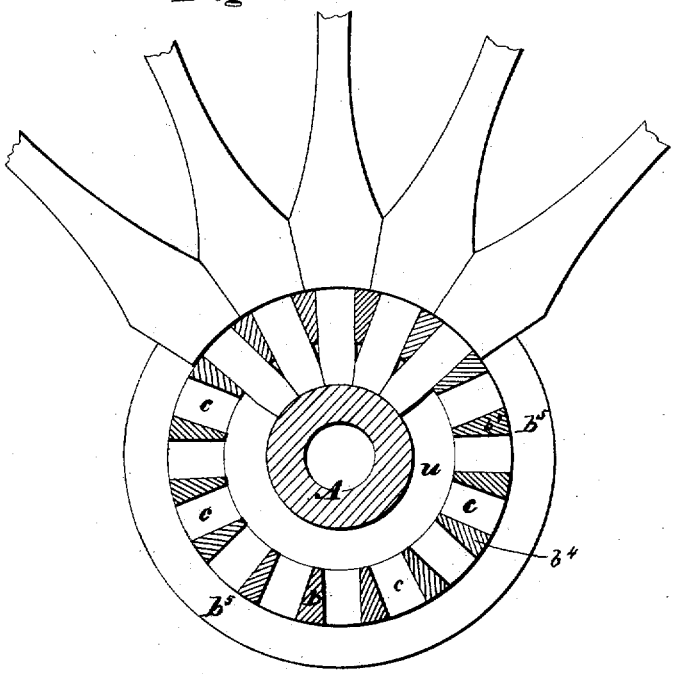
Figure 3:
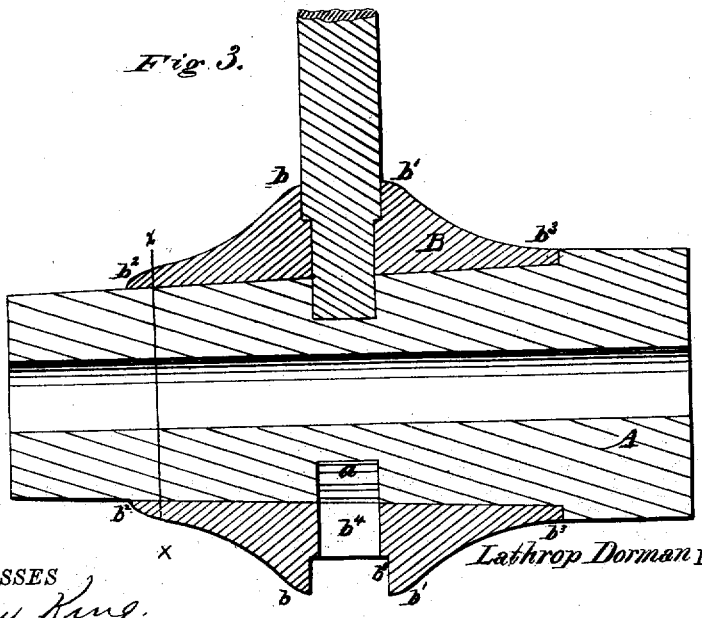

In the accompanying drawings, which form part of this specification, Figure 1 is a view, in perspective, of so much of my improved wheel as is necessary to illustrate the arrangement of the metallic shell upon the wooden core, the mortises in the shell, and the spokes above the mortises. Fig. 2 is a transverse section through Fig. 1, in the central line of the spokes, to illustrate the arrangement of the spokes in the grooved wooden core in the mortised shell, and above the mortises. Fig. 3 is a longitudinal section through the hub and one of the spokes; and Fig. 4 is a transverse section through the hub at the line *x x* of Fig. 3.

To carry out my invention I construct the hub with a central core, A, of wood, turned with a slight taper on its periphery toward one end, so that when the metallic shell B is driven on it will be tightly wedged upon the core. This wooden core has an annular groove, *a*, turned in its circumference at the proper part of its length, and of the proper width and depth for receiving the inner ends of the spokes, and supporting them, as will presently be more particularly described.

The core may be bored out and fitted with boxes in the usual manner, and the ends may be provided with sand-boxes, as usual.

The metallic shell B is cast in one piece, and comprises two circular flanges, $b$ $b^1$, tapering on their outer sides down into bands $b^2$ $b^3$. These flanges are connected by bars or ribs $b^4$, tapering from their outer to their inner edges, as seen in Fig. 2. These bars and flanges thus form mortises *c*, conforming in length and width to the width and thickness of the parts of the spokes to be fitted into them, as will presently be more particularly described. Preferably, these bars or ribs $b^4$ are stopped short of the circumference of the flanges, as shown in Figs. 2 and 3, thus leaving a continuous flange, $b^5$, above the mortises, on each side of the spoke. This shell also has a tapering bore corresponding to the tapered periphery of the wooden core, so as to insure a tight fit thereon. When this metallic shell is in place upon the wooden core above described, the groove in the core underlies the mortises in the shell, (as seen in Fig. 2,) so that I have in the wooden core a support for the inner end of each spoke upon the bottom of the groove, and supports for the edges of the inner part of each spoke at the sides of the groove, while the mortises in the metallic shell afford side and edge supports for the spokes above the wooden core, and the flanges $b^5$, when used, will afford still further supports to the edges of the spokes above the mortises, as seen in Figs. 1 and 2.

In addition to these various bearings and supports afforded by the above-described construction and arrangement of the core and shell, the tapering of the ribs or bars $b^4$, as shown and described, in combination with the annular groove, admits of the inner ends of the spokes being so shaped, and of such width and thickness, that they may not only fill the mortises in the shell, and also fill the groove in the core laterally, but the faces of the spokes may also fit against each other in the groove, so that the grooved part of the core will be annulated by the inner ends of the spokes, which will form a solid or continuous belt in the groove, and thus not only strengthen the core, but brace and support each other thoroughly, as seen in Fig. 2. Moreover, I contemplate turning out the groove *a* wider at the bottom than at the top, so as to increase the area of the bearing or supporting surfaces by thus giving the groove a dovetailed form, and I propose to correspondingly increase the width of the inner ends of the spokes, so that they will still fill the dovetail and annulate the enlarged grooved part of the core with a solid or continuous belt, by splitting the inner ends of the spokes, and, before entering them in the hub, fitting the splits with wedges, so that when the spokes are driven down upon the bottom of the groove the wedges will be driven up into the spokes, and spread their split ends laterally as far as the enlarged part of the groove will permit. This not only increases the area of bearing and supporting and bracing surfaces in the groove, and more thoroughly secures the spokes therein, but, in addition thereto, the angle of the dovetail, and the enlargement of the ends of the spokes in this angle, presents a strong resistance to the tendency of the spokes to loosen and draw away from the hub. Furthermore, to avail myself fully of the bearing and supporting and bracing surfaces afforded in the described construction of the metallic shell, I form shoulders upon the spokes, as shown in Fig. 2, so that when the spokes are driven home, and their lower ends have filled the groove in the core, as above described, these shoulders will rest upon and overlap the bars or ribs $b^4$, between the mortises, and abut against each other above them, so that the mortised shell will be annulated by a solid or continuous belt of wood formed by the shoulders of the spokes over and for some distance above the bars or ribs.

Having thus described the nature and object of my invention, what I claim as new, and desire to secure by Letters Patent, is—

1. The combination, with a grooved wooden core, of a mortised metallic shell, constructed and combined with the core, and operating in combination therewith, substantially as described.

2. The combination of a grooved wooden core, a mortised metallic shell, and spokes, the inner ends of which fill the groove in the core, and form a belt therein, substantially as and for the purposes described.

3. The combination of a mortised metallic shell, a wooden core with a dovetailed groove therein, the split spokes, and the wedges in the spokes, substantially as and for the purposes described.

4. The combination of a metallic mortised shell, a grooved wooden center or core, and the spokes, forming a continuous belt below or within the mortises, and a continuous belt above or around the mortises, substantially as described.

5. The combination, in a metallic shell, of the bars $b^4$ and flanges $b^5$, for supporting the spokes, substantially as described.

In testimony whereof I have hereunto subscribed my name.

L. DORMAN.

Witnesses:
JOEL W. WEBB,
WM. H. HAWKINS.